United States Patent [19]

Speelman et al.

[11] Patent Number: 4,839,405
[45] Date of Patent: Jun. 13, 1989

[54] ULTRAVIOLET STABILIZER COMPOSITIONS, STABILIZED ORGANIC MATERIALS, AND METHODS

[75] Inventors: David J. Speelman, Ashtabula; Allen J. Virant, Geneva, both of Ohio

[73] Assignee: Plasticolors, Inc., Ashtabula, Ohio

[21] Appl. No.: 96,208

[22] Filed: Sep. 8, 1987

Related U.S. Application Data

[63] Continuation of Ser. No. 883,082, Jul. 8, 1986, abandoned.

[51] Int. Cl.$^4$ ............................................. C08K 5/34
[52] U.S. Cl. .................................. 524/99; 252/403; 524/100; 524/102; 524/103; 524/195
[58] Field of Search ............... 524/99, 100, 102, 103, 524/195; 252/403

[56] References Cited

U.S. PATENT DOCUMENTS

| | | | |
|---|---|---|---|
| 3,004,896 | 10/1961 | Heller et al. | 167/90 |
| 3,330,859 | 7/1967 | Dexter et al. | 260/473 |
| 3,644,482 | 2/1972 | Dexter et al. | 260/473 |
| 3,799,990 | 3/1974 | Nast | 260/613 |
| 4,021,471 | 5/1977 | Virgillo et al. | 560/237 |
| 4,085,062 | 4/1978 | Virgillo et al. | 252/300 |
| 4,208,522 | 6/1980 | Ramey et al. | 544/385 |
| 4,315,848 | 2/1982 | Dexter | 524/94 |
| 4,511,596 | 4/1985 | Berner | 427/44 |
| 4,524,165 | 4/1985 | Musser | 524/99 |

OTHER PUBLICATIONS

Chakraburty et al: Chem. & Industry, 1, Apr. 1978 pp. 237-238.
Wiles, D. M.: Kinetics of UV Stab. of Polymers: Hindered Amines Stabilizers-Paper delivered New York State Univ. New Paltz, N.Y. Jun. 23-27, 1980, pp. 1-10.
Carlson, D. J. et al: J. Applied Polymer Science, vol. 22, 2217-2228(1978).

*Primary Examiner*—Veronica P. Hoke
*Attorney, Agent, or Firm*—Renner, Otto, Boisselle & Sklar

[57] ABSTRACT

Compositions are described which are useful for stabilizing organic materials normally subject to deterioration caused by ultraviolet light. The compositions comprise mixtures comprising
  (A) at least one hindered amine light stabilizer,
  (B) at least one formation characterized by the Formulae I and II as defined more fully in the specification and claims, and
  (c) at least one hindered phenolic antioxidant compound.

In addition to the above components, the compositions of the present invention also may contain at least one pigment normally used in the polymer materials. When organic materials normally subject to deterioration caused by ultraviolet light are modified to include an ultraviolet stabilizing effective amount of the compositions of the invention, the organic materials exhibit improved resistance to ultraviolet light degradation which generally is evidenced by improved color and gloss retention.

38 Claims, No Drawings

ULTRAVIOLET STABILIZER COMPOSITIONS, STABILIZED ORGANIC MATERIALS, AND METHODS

This application is a continuation of application Ser. No. 883,082, filed July 8, 1986, now abandoned.

TECHNICAL FIELD

This invention relates to compositions useful for stabilizing organic materials normally subject to deterioration caused by heat and/or untraviolet light. The invention relates to a composition comprising a unique mixture of a hindered amine light stabilizer, a substituted formamidine and a hindered phenolic antioxidant. The invention also relates to a method of preparing liquid stabilizer compositions.

BACKGROUND OF THE INVENTION

It is known that actinic radiation, particularly in the near ultraviolet region, has a deleterious affect on both the appearance and properties of many organic materials and particularly organic polymers. For example, it is well known that normally colorless or light-colored polyesters will yellow on exposure to sunlight as do cellulosics such as cellulose acetate. Organic polymers of various types have been used extensively to prepare films, sheets, and various molded, shaped or formed articles. In order for these articles to be used successfully in outdoor applications where they are exposed to sunlight, they must be able to retain their appearance, particularly with respect to color, gloss, transparency, shape and various physical properties such as impact strength, tensile strength, etc. Such articles, however, tend to degrade, and the physical properties of the articles are reduced when they are exposed to outdoor conditions including ultraviolet light, heat, water and oxygen over extended periods of time thereby rendering such articles less useful for many outdoor applications. Accordingly, considerable effort has been expended in the industry to improve the ability of such polymer materials to resist ultraviolet degradation. Many suggestions have been made in the prior art to provide some degree of protection against discoloration and degradation of such organic materials by the addition of various stabilizing compounds including a variety of hindered amine light stabilizers, a number of antioxidants based on phenols, and various combinations and mixtures of such stabilizing compounds.

For example, the use of various hindered amine light stabilizers for stabilizing organic materials such as polyesters and polyurethanes are described in U.S. Pat. Nos. 4,208,522; 4,315,848; 4,511,596; and 4,524,165. Various hindered phenols have been suggested as stabilizing additives to organic polymers for improving the resistance to ultraviolet light degradation in, for example, U.S. Pat. Nos. 3,799,990; 4,208,522; and 4,524,165.

It also has been suggested in the prior art that polymeric materials can be stabilized against ultraviolet light deterioration by the use of various benzotriazole derivatives. Examples of patents describing various benzotriazole derivatives as stabilizers and ultraviolet absorbers include U.S. Pat. Nos. 3,004,896; 4,315,848; 4,511,596; and 4,524,165.

The use of formamidines as ultraviolet absorbing compounds also is described in the prior art. U.S. Pat. Nos. 4,021,471 and 4,085,062 describe a number of N,N'-bis-aromatic formamidines reported to be useful for the protection of materials against the degradative effects of ultraviolet light.

A number of patents have suggested the use of combinations of the known ultraviolet light stabilizers provides improved results. For example, U.S. Pat. No. 4,208,522 describes the use of a combination of certain hindered amine light stabilizers with antioxidants such as the hindered phenols. A variety of useful phenolic compounds are described in the U.S. Pat. No. 4,208,522. Combinations of hindered amine light stabilizers with benzotriazole derivatives are described in U.S. Pat. Nos. 4,315,848 and 4,511,596 describes combinations of hindered amine light stabilizers with a variety of ultraviolet absorbers including benzotriazole derivatives, hydroxybenzophenones, esters of benzoic acids, oxalic acid diamides, etc. It is suggested in U.S. Pat. No. 4,524,165 that polyesterether compositions can be stabilized by the combination of (1) at least one hindered phenolic antioxidant, (2) at least one ultraviolet light stabilizing compound similar to the ultraviolet absorbers disclosed in U.S. Pat. No. 4,511,596, and (3) at least one hindered amine light stabilizing compound of certain specified formulae. In spite of all the suggestions in the prior art for improving the stability of various organic materials to the degradative effects of ultraviolet light, there continues to be a need for improved stabilizer systems or organic materials, particularly organic polymers which will provide further improved properties with respect to color retention, gloss retention, transparency, shape, weatherability, etc.

SUMMARY OF THE DISCLOSURE

Compositions are described which are useful for stabilizing organic materials normally subject to deterioration caused by ultraviolet light. The compositions comprise mixtures comprising (A) at least one hindered amine light stabilizer, (B) at least one formamidine characterized by the Formulae I and II as defined more fully in the specification and claims, and (C) at least one hindered phenolic antioxidant compound.

In addition to the above components, the compositions of the present invention also may contain at least one pigment normally used in the polymer materials. When organic materials normally subject to deterioration caused by ultraviolet light are modified to include an ultraviolet stabilizing effective amount of the compositions of the invention, the organic materials exhibit improved resistance to ultraviolet light degradation which generally is evidenced by improved color and gloss retention.

The invention also includes methods for stabilizing organic materials normally subject to deterioration and organic materials which have been stabilized by the presence of the combination of the three types of stabilizing compounds. The present invention also includes a method for preparing stable liquid solutions comprising the combination of stabilizer compounds of the present invention.

DESCRIPTION OF THE PREFERRED EMBODIMENTS

The compositions of the present invention which are useful for stabilizing organic materials normally subject to deterioration, caused by ultraviolet light comprise a mixture of (A) at least one hindered amine light stabilizer, (B) at least one formamidine of the Formulae I and II as defined more fully below, and (C) at least one hindered phenolic antioxidant compound.

Component A: Hindered Amine Light Stabilizer

The compositions of the present invention will contain at least one hindered amine light stabilizer. A variety of hindered amine light stabilizers suggested in the prior art as ultraviolet light stabilizers for organic materials can be utilized in the compositions of the present invention.

In one embodiment, the hindered amine light stabilizer useful as component (A) can be characterized by the general formulae

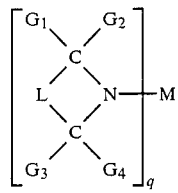

(III)

or

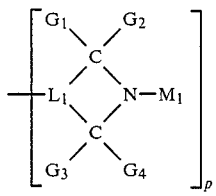

(IV)

wherein q is 1 or 2, p is 2 to 14, $G_1$, $G_2$, $G_3$ and $G_4$ are independently alkyl; or $G_1$ and $G_3$ together are alkylene or each are carboalkoxy or carbophenethoxy; or $G_1$ and $G_2$ or $G_3$ and $G_4$, independently of one another, together are alkylene or azaalkylene,; if q is 1, M is hydrogen, hydroxyl, oxyl, optionally substituted alkyl, alkenyl, alkynyl, aralkyl, alkanoyl, alkenoyl, benzoyl, glycidyl or —CH$_2$CHOHZ where Z is hydrogen, methyl or phenyl; if q is 2, M is alkylene, alkenylene, alkynylene, arylenedialkylene, the group —(CH$_2$)$_2$OOCR$_{18}$COO(CH$_2$)$_2$— or the group —CH$_2$OOOCR$_{19}$COOCH$_2$— where R$_{18}$ is alkylene and R$_{19}$ is alkylene, xylylene or cyclohexylene; M$_1$ has the meaning of M where q is 1; L is a divalent organic group which supplements the N-containing ring to form a 5 to 7 membered ring, or is two monovalent organic groups; and L$_1$ is a divalent organic group which supplements the N-containing ring to form a 5 to 7 membered ring and which additionally provides a linking group to other hindered amine moieties.

More particularly, the hindered amine light stabilizers which have found utility in the compositions of the present invention are derivatives of 2,2,6,6-tetraalkylpiperadines which contain a group of the formula

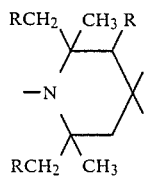

(X)

wherein R is hydrogen or methyl.

The hindered amine light stabilizers useful in the composition of the present invention include particularly the following types of compounds:

(1) light stabilizers of formula

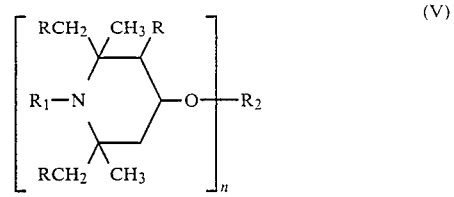

(V)

in which n is a number from 1 to 4 inclusive, preferably 1 or 2; R is hydrogen or lower alkyl; R$_1$ is hydrogen, oxyl, C$_{1-18}$ aklyl, C$_{3-8}$ alkenyl, C$_{3-8}$ alkynyl, C$_{7-12}$ aralkyl, C$_{1-8}$ alkanoyl, C$_{3-5}$ alkenoyl, glycidyl, a group —CH$_2$CH(OH)—Z wherein Z is hydrogen, methyl or phenyl, with R$_1$ preferably being hydrogen, C$_{1-12}$ alkyl, allyl, benzyl, acetyl or acryloyl; and R$_2$ when n is 1 is hydrogen, C$_{1-18}$ alkyl optionally interrupted by one or more oxygen atoms, cyanoethyl, benzyl, glycidyl, a monovalent radical of an aliphatic, cycloaliphatic, araliphatic or aromatic carboxylic acid, or a carbamic acid or of a phosphorus-containing acid, or a monovalent silyl group, preferably a group of an aliphatic carboxylic acid having 2 to 18 carbon atoms, of a cycloaliphatic carboxylic acid having 5 to 12 carbon-atoms or of an aromatic carboxylic acid having 7 to 15 carbon atoms; R$_2$ when n is 2 is C$_{1-2}$ alkylene, C$_{4-12}$ alkenylene, xylylene, a bivalent group of an aliphatic, cycloaliphatic, araliphatic or aromatic dicarboxylic acid, or dicarbamic acid or of a phosphorus-containing acid, or a bivalent silyl group, preferably a group of an aliphatic dicarboxylic acid having 2 to 36 carbon atoms, of a cycloaliphatic or aromatic dicarboxylic acid having 8 to 14 carbon atoms, or of an aliphatic, cycloaliphatic or aromatic dicarbamic acid having 8 to 14 carbon atoms; R$_2$ when n is 3 is a trivalent group of an aliphatic, cycloaliphatic or aromatic tricarboxylic acid, of an aromatic tricarbamic acid or of a phosphorus-containing acid, or a trivalent silyl group; and R$_2$ when n is 4 is a tetravalent group of an aliphatic, cycloaliphatic or aromatic tetracarboxylic acid.

If any of the substituents are alkyl groups containing from 1 to 12 carbon atoms, they are exemplified by methyl, ethyl, n-propyl, n-butyl, sec-butyl, tert-butyl, n-hexyl, n-oxtyl, 2-ethylhexyl, n-nonyl, n-decyl, n-undecyl or n-dodecyl.

When R$_1$ or R$_2$ contain from 1 to about 18 carbon atoms, they can be any of the groups given above, and furthermore, may be n-tridecyl, n-tetradecyl, n-hexadecyl or n-octadecyl. When R$_1$ is an alkenyl group containing from about 3 to about 8 carbon atoms, such group is exemplified by 1-propenyl, allyl, methallyl, 2-butenyl, 2-pentenyl, 2-hexenyl, 2-octenyl, or 4-tert-butyl-2-butenyl. An example of an R$_1$ alkynyl group is propargyl. Examples of aralkyl groups R$_1$ include benzyl, phenethyl, etc. As mentioned, R$_1$ also may be an alkanoyl group containing from 1 to about 8 carbon atoms, and examples of such groups include formyl, propionyl, butyryl, octanoyl and acetyl. R$_2$ also may be a monovalent group of a carboxylic acid such as a group derived from acetic acid, stearic acid, salicyclic acid, methacrylic acid, maleic acid, benzoic acid and beta-(3,5-di-tert-butyl-4-hydroxyphenyl) propionic acid.

If $R_2$ is a bivalent group of a dicarboxylic acid, it may be, for example, a group of adipic acid, subaric acid, sebacic acid, phthalic acid, dibutylmalonic acid, dibenzyl malonic acid, or butyl-(3,5-di-tert-butyl-4-hydroxybenzyl) malonic acid, or bicycloheptenedicarboxylic acid. $R_2$ also may be a trivalent group of a tricarboxylic acid such as a group of trimellitic acid or of nitrillotriacetic acid.

The following compounds are examples of polyalkyl piperidine light stabilizers of the type represented by Formula V:

A-1 4-hydroxy-2,2,6,6-tetramethylpiperidine
A-2 1-allyl-4-hydroxy-2,2,6,6-tetramethylpiperidine
A-3 1-benzyl-4-hydroxy-2,2,6,6-tetramethylpiperidine
A-4 1-(4-tert-butyl-2-butenyl)-4-hydroxy-2,2,6,6-tetramethylpiperidine
A-5 4-stearoyloxy-2,2,6,6-tetramethylpiperidine
A-6 1-ethyl-4-salicyloyloxy-2,2,6,6-tetramethylpiperidine
A-7 4-methacryloyloxy-1,2,2,6,6-pentamethylpiperidine
A-8 1,2,2,6,6-pentamethylpiperidin-4-yl-beta(3,5-di-tert-butyl-4-hydroxyphenyl)-propionate
A-9 1-benzyl-2,2,6,6-tetramethyl-4-piperidinylmaleinate
A-10 (di-2,2,6,6-tetramethylpiperidin-4-yl)-adipate
A-11 (di-2,2,6,6-tetramethylpiperidin-4-yl)-sebacate
A-12 (di-1,2,3,6-tetramethyl-2,6-diethyl-piperidin-4-yl)-sebacate
A-13 (di-1-allyl-2,2,6,6-tetramethyl-piperidin-4-yl)-phthalate
A-14 1-acetyl-2,2,6,6-tetramethylpiperidin-4-yl-acetate
A-15 trimellitic acid-tri-(2,2,6,6-tetramethylpiperidin-4-yl)ester
A-16 1-acryloyl-4-benzyloxy-2,2,6,6-tetramethylpiperidine
A-17 dibutyl-malonic acid-di-(1,2,2,6,6-pentamethylpiperidin-4-yl)-ester
A-18 dibenzyl-malonic acid-di-(1,2,3,6-tetramethyl-2,6-diethyl-piperidin-4-yl)-ester
A-19 dimethyl-bis-(2,2,6,6-tetramethylpiperidin-4-oxy)-silane
A-20 tris-(1-propyl-2,2,6,6-tetramethylpiperidin-4-yl)-phosphite
A-21 tris-(1-propyl-2,2,6,6-tetramethylpiperidin-4-yl)-phosphate (2) Hindered amine light stabilizers characterized by Formula VI:

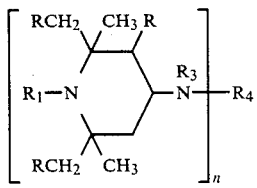

(VI)

in which n is the number 1 or 2; R is hydrogen or methyl; $R_1$ is hydrogen, oxyl, $C_{1-18}$ alkyl, $C_{3-8}$ alkenyl, $C_{3-8}$ alkynyl, $C_{7-12}$ aralkyl, $C_{1-8}$ alkanoyl or $C_{3-5}$ alkenoyl; $R_3$ is hydrogen, $C_{1-12}$ alkyl, $C_{5-7}$ cycloalkyl, $C_{7-8}$ aralkyl, $C_{2-18}$ alkanoyl, $C_{3-5}$ alkenoyl or benzoyl; and $R_4$ when n is 1 is hydrogen, $C_{1-18}$ alkyl, $C_{5-7}$ cycloalkyl, $C_{2-8}$ alkenyl which is unsubstituted or substituted by a cyano, carbonyl or carbamide group, or it is glycidyl, a group of the formula —CH$_2$—CH(OH)—Z or of the formula —CON—H—Z wherein Z is hydrogen, methyl or phenyl; or $R_4$ when n is 2 is $C_{2-12}$ alkylene, $C_{6-12}$ arylene, xylylene, a —CH$_2$—CH(OH)—CH$_2$— group or a group —CH$_2$—CH(OH)—CH$_2$—OOX$_0$O—CH$_2$—CH(OH)—CH$_2$— wherein X is $C_{2-10}$ alkylene, $C_{6-15}$ arylene or $C_{6-12}$ cycloalkylene; or, provided that $R_3$ is not alkanoyl, alkenoyl or benzoyl, $R_4$ can also be a bivalent group of an aliphatic, cycloaliphatic or aromatic dicarboxylic acid or dicarbamic acid, or can also be the group —CO—; or $R_3$ and $R_4$ together when n is 1 can be the cyclic group of an aliphatic or aromatic 1,2- or 1,3-dicarboxylic acid.

If any of these groups are alkyl groups containing from 1 to about 18 carbon atoms, they are as already defined above with respect to Formula V. An example of a cycloalkyl group containing from about 5 to about 7 carbon atoms is cyclohexane, and examples of aralkyl groups, $R_3$ containing from about 7 to about 8 carbon atoms include phenethyl and benzyl. Examples of $R_3$ groups when $R_3$ is an alkanoyl group containing from about 2 to about 18 carbon atoms include, for example, propionyl, buteryl, octanoyl, dodecanoyl, hexadecanoyl, octadecanoyl, and acetyl.

$R_4$ isn Formula VI is an alkenyl group containing from about 2 to about 8 carbon atoms which may be further substituted by a cyano, carbonyl or carbamide group. $R_4$ is exemplified by 1-propionyl, allyl, methallyl, 2-butenyl, 2-pentenyl, 2-hexenyl, 2-octenyl, 2,2-dicyanovinyl, 1-methyl-2-cyano-2-methoxy carbonylvinyl, and 2,2-diacetylaminovinyl. Examples of alkylene groups containing from about 2 to about 12 carbon atoms include, for example, ethylene, propylene, 2,2-dimethylpropylene, tetramethylene, hexamethylene, oxtamethylene, decamethylene, or dodecamethylene. Examples of arylene groups containing from 6 to 15 carbon atoms include o-, m- or p-phenylene, 1,4-naphthylene and 4,4'-diphenylene. The following compounds are examples of polyalkylpiperidine light stabilizers of the class represented by Formula VI.

A-22 N,N'-bis-(2,2,6,6-tetramethylpiperidin-4-yl)-hexamethylene-1,6-diamine
A-23 N,N'-bis-(2,2,6,6-tetramethylpiperidin-4-yl)-hexamethylene,1,6-diacetamide
A-24 1-acetyl-4-(N-cyclohexylacetamide)-2,2,6,6-tetramethyl-piperidine
A-25 4-benzylamino-2,2,6,6-tetramethylpiperidine
A-26 N,N'-bis-(2,2,6,6-tetramethylpiperidin-4-yl)-N,N'-dibutyl-adipamide
A-27 N,N'-bis-(2,2,6,6-tetramethylpiperidin-4-yl)-N,N'-dicyclohexyl-(2-hydroxypropylene)
A-28 N,N'-bis-(2,2,6,6-tetramethylpiperidin-4-yl)-p-xylylene-diamine
A-29 4-(bis-2-hydroxyethyl)-amino-1,2,2,6,6-pentamethylpiperidine
A-30 4-methacrylamide-1,2,2,6,6-pentamethylpiperidine
A-31 alpha-cyano-beta-methyl-beta-[N-(2,2,6,6-tetramethylpiperidin-4-yl)]-amino-acrylic acid methyl ester The hindered amine light stabilizers useful as component (A) in the present invention also may be substituted piperizinediones characterized by the following Formula VII

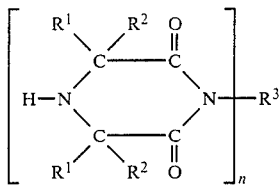

wherein $R^1$ and $R^2$ are each independently methyl or ethyl or together with the carbon to which they are bound from a cyclopentyl or cyclohexyl ring which is unsubstituted or substituted with a methyl group; n is an integer of from 1 to 3; when n is 1, $R^3$ is an alkyl group of from 1 to about 20 carbon atoms or a benzyl group; when n is 2, $R^3$ is an alkylene group of from 1 to about 20 carbon atoms, a p-xylylene group or an alkyl-substituted p-xylylene group of the formula

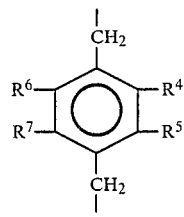

wherein $R^4$, $R^5$, $R^6$ and $R^7$ is hydrogen or lower alkyl group containing from 1 to 5 carbon atoms; when n is 3, $R^3$ is a 1,3,5-mesitylene group or a 2,4,6-alkyl substituted mesitylene group or a 2,4,6-alkyl-substituted mesitylene group of the formula

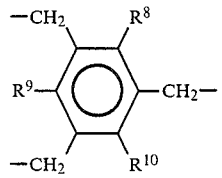

wherein $R^8$, $R^9$ and $R^{10}$ are hydrogen or lower alkyl, containing from 1 to about 5 carbon atoms.

The hindered amine light stabilizers represented by Formula VII can be prepared by reacting a substituted piperizinedione (such as a dione represented by Formula VII wherein n is 0 and $R_3$ is hydrogen) with an organic mono-, di- or tri-halo compound. The alkylation reaction is carried out by first preparing the alkali or alkaline earth metal salt of the starting piperizine dione and then reacting the salt with the appropriate organic halide in a solvent such as dimethyl formamide, isopropanol or acetone at about 75° C. Examples of organic halides which can be reacted with the starting piperazinedione include organic monohalide such as methyliodide, ethyl chloride, propyl chloride, pentyl bromide, dodecyl bromide, etc.; organic dihalides such as methylene bromide, dibromoethane, 1,3-dibromobutane, 1,12-dichlorododecane, etc.; and organic trihalide such as alpha,alpha',alpha''-trichloromesitylene. The preferred organic monohalides contain from about 6 to about 18 carbon atoms, and the preferred dihalides contain from about 2 to about 12 carbon atoms.

The preparation of substituted piperazinediones represented by Formula VII which are useful as hindered amine light stabilizers in the compositions of the present invention are known in the art and have been described in, for example, U.S. Pat. No. 4,208,522. The disclosure of U.S. Pat. No. 4,208,522 relating to the description of and preparation of hindered amine light stabilizers such as those represented by Formula VII is herein incorporated by reference.

Other hindered amine light stabilizers of the type characterized broadly by Formulae III, IV and X above can be utilized as component (A) in the present invention. Further examples of such amine stabilizers is believed unnecessary in view of the many discussions, descriptions and examples contained in the prior art such as, for example, in U.S. Pat. Nos. 4,315,848; 4,511,596; and 4,524,165. The disclosures of these patents relating to various examples of hindered amine light stabilizers is herein incorporated by reference.

A number of hindered amine light stabilizers coming within the definition of Formulae III—VII and X are available commercially such as from the Ciba-Geigy Corporation, and specific examples include "Tinuvin 770" which is idenfitied as bis-(2,2,6,6-tetramethyl-4-piperidyl)-sebacate, "Tinuvin 765" which is identified as bis-(1,2,2,6,6-pentamethyl-4-piperidinyl)-sebacate, "Tinuvin 144" which is bis-(1,2,2,6,6-pentamethyl-4-piperidinyl)-2-n-butyl-2-(3',5'-di-tert-butyl-4-hydroxybenzyl) malonate, and "Tinuvin 622" which is a polyester of succinic acid and N-beta-hydroxyethyl-2,2,6,6-tetramethyl-4-hydroxy-piperidine.

Component (B): Formamidine Compounds

The compositions of this invention also contain at least one substituted formamidine ultraviolet absorber or stabilizer. In one embodiment, the substituted formamidines are characterized by the general structure

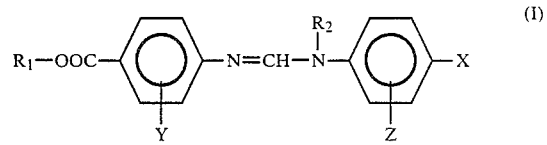

wherein $R_1$ is an alkyl group containing 1 to about 5 carbon atoms; Y is a H, OH, Cl or an alkoxy group; $R_2$ is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen.

The substituted formamidines of the present invention are prepared in a number of ways, the method chosen being dependent upon the available starting material.

One method utilizes as intermediates, the formamidates of the general formula

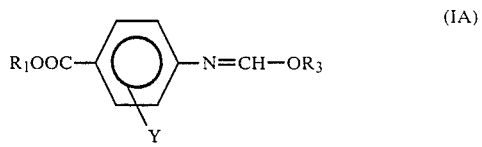

wherein $R_1$ and Y are as defined previously and $R_3$ is an alkyl group of from 1 to about 5 carbon atoms. The formamidates, IA, are prepared by reacting the corresponding 4-aminobenzoate wiht a trialkyl orthoformate as illustrated below.

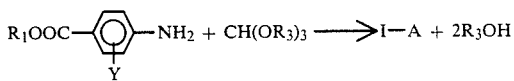

The reaction is deffected by heating the reactants from 80° C. to 200° C., and the preferred temperature range is 130° C. to 160° C. The preferred procedure is to remove the alcohol which is formed during the reaction. The reaction is completed when no more alcohol is produced. Any trialkylorthoformate may be used but it is preferred to use the commercially available triethyl or trimethyl orthoformates.

The formamides I also can be prepared by reacting the formimidates IA with N-alkylanilines as illustrated by the following reaction: I, IA, X, Z, $R_2$, and $R_3$ being as previously defined.

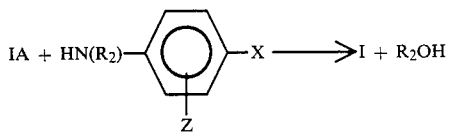

Reaction is effected by heating the reactants from 80° C. to 250° C., the preferred temperature range being 170° C. to 210° C. A preferred procedure is to remove the alcohol which is formed during the reaction. The reaction is completed when no more alcohol is produced.

The N-alkylanilines, can be prepared by methods known in the art. The N-alkylaniles, can be prepared, for example, from the corresponding anilines. Any of the methods known in the art for monoacylating primary amines, alkylating amides and hydrolyzing amides can be used in the preparation of the desired N-alkylanilines.

Another method for preparing the formamidines used in this invention uses the reaction of an aminobenzoate with a formamide in the presence of a suitable catalyst such as phosphorus pentachloride to form the formamidines of structure I.

Specific examples of formamidines useful as component (B) are as follows:

B-1 N'-(4-Ethoxycarbonylphenyl)-N-methyl-N-phenylformamidine
B-2 N'-(4-Ethoxycarbonylphenyl)-N-ethyl-N-phenylformamidine
B-3 N'-(4-Ethoxycarbonylphenyl)-N-(4-methoxyphenyl)-N-methylformamidine
B-4 N,N'-Bis(4-ethoxycarbonylphenyl)-N-methylformamidine
B-5 N-(4-Dimethylaminophenyl)-N'-(4-ethoxy-carbonylphenyl)-N-methylformamidine
B-6 N'-(4-Ethoxycarbonylphenyl)-N-(2-methoxyphenyl)-N-methylformamidine
B-7 N'-(4-Ethoxycarbonylphenyl)-N-(3,4-dichlorophenyl)-N-methylformamidine
B-8 N-(4-Butoxycarbonylphenyl)-N'-(4-ethoxycarbonylphenyl)-N-methylformamidine
B-9 N'-(4-Butoxycarbonylphenyl)-N-methyl-N-phenylformamidine
B-10 N'-(3-Hydroxy-4-methoxycarbonylphenyl)-N-methyl-N-phenylformamidine
B-11 N-Butyl-N-phenyl-N'-(4-ethoxycarbonylphenyl)-formamidine
B-12 N'-(4-Ethoxycarbonylphenyl)-N-(n-octyl)-N-phenylformamidine
B-13 N,N-Diphenyl-N'-(4-ethoxycarbonylphenyl)formamidine
B-14 N'-(4-Ethoxycarbonyl-3-methoxyphenyl)-N'-methyl-N-phenylformamidine
B-15 N'-(4-Isopropoxycarbonylphenyl)-N-methyl-N-phenylformamidine
B-16 N'-(4-Ethoxycarbonylphenyl)-N-methyl-N-(p-ethylophenylformamidine
B-17 N'-(2-Chloro-4-methoxycarbonylphenyl)-N-methyl-N-phenylformamidine The following examples are presented to provide a more detailed description of the preparation of substituted formamidines useful as component (B) in the present invention. Unless otherwise indicated in the examples and elsewhere in the specification and claims, all parts and percentages are by weight and all temperatures are in degrees centigrade.

EXAMPLE B-1

Preparation of N-(p-ethoxycarbonylphenyl)-N'-methyl-N'-phenylformamidine

The intermediate ethyl (4-ethoxycarbonylphenyl) formamidate is prepared by reacting 82.6 parts (0.5 mole) of ethyl 4-aminobenzoate and 148.2 parts (1 mole) of tri-ethyl orthoformate by heating at 145° C. until about 56 parts of ethanol is collected by distillation. Excess tri-ethyl orthoformate is removed by vacuum distillation, and the residue is distilled to yield the desired formamidate intermediate.

The above prepared formamidate intermediate (11 parts, 0.05 mole) and 5.4 parts (0.05 mole) of N-methylaniline are heated at 190° C. until about 1.5 parts of ethanol are collected by distillation. The viscous yellow oil remaining in the reaction vessel is flashdistilled to yield the desired product having a boiling point of 188° C. at 0.1 mm.

EXAMPLE B-2

Preparation of N-(p-ethoxycarbonylphenyl)-N'-ethyl-N'-phenylformamidine.

The procedure of Example B-1 is repeated with the exception that the formamidate intermediate is reacted with 0.05 mole of N-ethylaniline.

It is believed unnecessary to unduly lengthen the specification by including additional examples of the preparation of substituted formamidines useful in the present invention. Additional examples of the preparation of substituted formamidines characterized by Formula I are contained in U.S. Pat. No. 4,021,471, and the disclosure of said patent containing additional specific examples of the preparation of substituted formamidines characterized by Formula I is herein incorporated by reference.

As mentioned above, the substituted formamidines useful in the present invention also may be N,N'-bisaromatic formamidines of the general formula

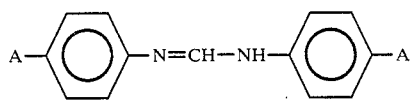

(II)

wherein A is —COOR, —COOH, —CONR'R", —NR'COR, —CN, or a phenyl group; and wherein R is an alkyl group of from one to about 8 carbon atoms; R' and R" are each independently hydrogen or lower alkyl groups of from 1 to about 4 carbon atoms.

Methods for the preparation of substituted formamidines as represented by Formula II are known in the art. For example, the formamidines of Formula II can be prepared by the reaction of about 2 molar amounts of the appropriate substituted aniline with a molar amount of an appropriate orthoformate. The reaction can be accomplished by heating the mixture, generally with the removal of alcohol as it is formed, or the reaction can be accomplished at lower temperatures by utilizing acid catalysts. Alternatively, a substituted aniline can be reacted with formic acid to form a formyl derivative (ArNCHO), which then can be condensed with a second mole of aniline or a substituted aniline in the presence of phosphorus halide (e.g., PCl$_5$), SOCl$_2$, etc. The formamidines prepared by the above techniques generally are white crystalline solids which can be recovered by crystallization from an appropriate solvent such as, for example, toluene, hexane, benzene, cyclohexane, etc.

Generally, the R group of the ester will be a lower alkyl group contining from about 1 to about 8 carbon atoms. The R and/or R' of the amide group generally will be hydrogen or a lower alkyl containing from 1 to about 4 carbon atoms.

Specific examples of formamidines characterized by Formula II are as follows:

| No. | A | Compound Name |
|---|---|---|
| B-18 | —COOH | N,N'—bis(p-carboxyphenyl)formamidine |
| B-19 | —COOMe | N,N'—bis(p-methoxycarbonylphenyl)formamidine |
| B-20 | —COOEt | N,N'—bis(p-ethoxycarbonylphenyl)formamidine |
| B-21 | —COO-n-Bu | N,N'—bis(p-n-butoxycarbonylphenyl)foramidine |
| B-22 | —COO-n-octyl | N,N'—bis(p-n-octoxycarbonylphenyl)formamidine |
| B-23 | —C≡N | N,N'—bis(p-cyanophenyl)formamidine |
| B-24 | Phenyl | N,N'—bis(p-phenylphenyl)formamidine |
| B-25 | —NHCOMe | N,N'—bis(p-acetamidophenyl)formamidine |
| B-26 | —CONH$_2$ | N,N'—bis(p-carbamylphenyl)formamidine |
| B-27 | —CONH-t-butyl | N,N'—bis(p-n-t-butylcarbamylphenyl)formamidine |
| B-28 | —COONa | N,N'—bis(p-carboxyphenyl)formamidine, disodium salt |
| B-29 | —CON(n-butyl)$_2$ | N,N'—bis(p-N—Di-n-butylcarbamyphenyl)formamidine |

The following example illustrates the preparation of formamidines characterized by Formula II.

EXAMPLE B-23

N,N'-bis-(p-cyanophenyl)formamidine

A mixture of 10 parts (0.085 mole) of p-aminobenzonitrile and 6.2 parts (0.042 mole) of triethylorthoformate is prepared and heated at 150° C. while removing ethanol by distillation. When no additional ethanol can be recovered by distillation, the mixture is cooled, and 100 parts of ether are added. The desired product is isolated by filtration and is characterized by a melting point of 220°-221.5° C.

The procedure described in Example B-23 can be repeated at room temperature when about 0.01 part of para-toluene sulfonic acid is included in the mixture as a catalyst.

Other compounds of groups B-18 to B-29 can be prepared by similar methods by utilizing the appropriate p-substituted aniline.

Substituted formamidines of the type described above commercially available from, for example, the Givaudan Corporation, Clifton, N.J. One example is the product marketed under the trade designation "GIVSORB UV-2" which is identified as N-(p-ethoxycarbonylphenyl)-N'-ethyl-N'-phenylformamidine.

Component C: Hindered Phenolic Antioxidant Compound

The compositions of the present invention also contain at least one hindered phenolic antioxidant compound, and these compounds may be any of the hindered phenolic antioxidants typically used to provide thermal stabilization with the least discoloration of the polymers.

In one embodiment, the hindered phenolic antioxidant compound (C) is characterized by Formula IX

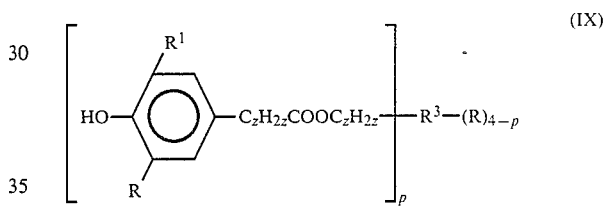

(IX)

R is hydrogen or lower alkyl; R$^1$ is lower alkyl; z is an integer from 2 to about 6; p is an integer from 2 to 4; R$^3$ is a tetravalent group selected from aliphatic hydrocarbons containing from 1 to about 30 carbon atoms, aliphatic mono- and dithioethers containing from 1 to about 30 carbon atoms, and aliphatic mono- and diethers containing from 1 to about 30 carbon atoms.

The lower alkyl groups R and R$^1$ in Formula IX may contain from 1 to about 8 carbon atoms and these are exemplified by methyl, ethyl, propyl, n-butyl, n-hexyl, etc. In another preferred embodiment, the group R$^3$ in Formula IX is a tetravalent group selected from aliphatic hydrocarbons containing from 1 to about 30 carbon atoms.

The following examples illustrate the hindered phenolic antioxidant compounds which are particularly useful in the present invention.

| Type-1 | |
|---|---|
| C-1 | n-Octadecyl 3-(3,5-di-t-butyl-4-hydroxyphenyl)-propionate |
| C-2 | n-Octadecyl 2-(3,5-di-t-butyl-4-hydroxyphenyl)-acetate |
| C-3 | n-Octadecyl 3,5-di-t-butyl-4-hydroxybenzoate |
| C-4 | n-Hexyl 3,5-di-t-butyl-4-hydroxyphenylbenzoate |
| C-5 | n-Dodecyl 3,5-di-t-butyl-4-hydroxyphenylbenzoate |
| C-6 | Neo-dodecyl 3-(3,5-di-t-butyl-4-hydroxyphenyl) propionate |
| C-7 | Dodecyl beta-(3,5-di-t-butyl-4-hydroxyphenyl) propionate |
| C-8 | Ethyl alpha-(4-hydroxy-3,5-di-t-butylphenyl)-isobutyrate |

-continued

| Type-1 | |
|---|---|
| C-9 | Octadecyl alpha-(4-hydroxy-3,5-di-t-butylphenyl)isobutyrate |
| C-10 | Octadecyl alpha-(4-hydroxy-3,5-di-t-butylphenyl)propionate |

| Type-2 | |
|---|---|
| C-10 | 2-(n-octylthio)ethyl 3,5-di-t-butyl-4-hydroxybenzoate |
| C-11 | 2-(n-octylthio)ethyl 3,5-di-t-butyl-4-hydroxyphenylacetate |
| C-12 | 2-(n-octadecylthio)ethyl 3,5-di-t-butyl-4-hydroxyphenylacetate |
| C-13 | 2-(n-octadecylthio)ethyl 3,5-di-t-butyl-4-hydroxy benzoate |
| C-14 | 2-(2-hydroxyethylthio)ethyl 3,5-di-t-butyl-4-hydroxybenzoate |
| C-15 | Diethyl glycol bis-(3,5-di-t-butyl-4-hydroxyphenyl)propionate |
| C-16 | 2-(n-octadecylthio)ethyl 3-(3,5-di-t-butyl-4-hydroxyphenyl)propionate |
| C-17 | Stearamido N,N—bis-[ethylene 3-(3,5-di-t-butyl-4-hydroxyphenyl)propionate] |
| C-18 | n-Butylimino N,N—bis-[ethylene 3-(3,5-di-t-butyl-4-hydroxyphenyl)propionate] |
| C-19 | 2-(2-stearoyloxyethylthio)ethyl 3,5-di-t-butyl-4-hydroxybenzoate |
| C-20 | 2-(2-stearoyloxyethylthio)ethyl 7-(3-methyl-5-t-butyl-4-hydroxyphenyl)heptanoate |

| Type-3 | |
|---|---|
| C-21 | 1,2-propylene glycol bis-[3-(3,5-di-t-butyl-4-hydroxyphenyl)propionate] |
| C-22 | Ethylene glycol bis-[3-(3,5-di-t-butyl-4-hydroxyphenyl)propionate] |
| C-23 | Neopentylglycol bis-[3-(3,5-di-t-butyl-4-hydroxyphenyl)propionate] |
| C-24 | Ethylene glycol bis-(3,5-di-t-butyl-4-hydroxyphenylacetate) |
| C-25 | Glycerine-1-n-octadecanoate-2,3-bis-(3,5-di-t-butyl-4-hydroxyphenylacetate |
| C-26 | Pentaethylthritol-tetrakis-[3-(3',5'-di-t-butyl-4'-hydroxyphenyl)propionate] |
| C-27 | 1,1,1-trimethylol ethane-tris-3-(3,5-di-t-butyl-4-hydroxyphenyl)propionate |
| C-28 | Sorbitol hexa-[3-(3,5-di-t-butyl-4-hydroxyphenyl)propionate] |
| C-29 | 2-hydroxyethyl 7-(3-methyl-5-t-butyl-4-hydroxyphenyl)heptanoate |
| C-30 | 2-stearoyloxyethyl 7-(3-methyl-5-t-butyl-4-hydroxyphenyl)heptanoate |
| C-31 | 1,6-n-hexanediol-bis[(3',5'-di-t-butyl-4-hydroxyphenyl)-propionate] |
| C-32 | pentaerythritol-tetrakis(3,5-di-tert-butyl-4-hydroxy hydrocinnamate |

The above phenolic ester stabilizers of Types 1, 2 and 3 are more fully described in U.S. Pat. Nos. 3,330,859 and 3,644,482.

Some of the hindered phenolic antioxidant compounds of the above types are available commercially. For example, Example C-1 is available from Ciba-Geigy under the general trade designation "Irganox 1076", and the phenol of Example C-33 is available from Ciba-Geigy Company under the trade designation "Irganox 1010".

As mentioned above, other phenolic compounds normally used in the stabilization of polymer materials can be utilized as the hindered phenol antioxidant compounds in the compositions of the present invention. A large number of different types of hindered phenol antioxidant compounds is included in U.S. Pat. No. 4,208,522 and more particularly in Cols. 3-8, and these include, for example, di-(higher)alkyl phenolic phosphonates (more fully described in U.S. Pat. No. 3,281,505) and hydroxyphenyl alkenyl isocyanurates. The disclosure of U.S. Pat. No. 4,208,522 with respect to such phenolic compounds, and particularly is found in Cols. 3-8 is herein incorporated by reference.

It has been discovered that the combination of components (A), (B) and (C) results in improved stabilization of organic materials which are normally subject to deterioration. In general, the amount of the three components incorporated into the organic material will be an amount which is effective to reduce deterioration caused by heat and/or ultraviolet light. Although the amount of the three stabilizers incorporated into an organic material will depend on a number of factors such as the nature of the organic material, the color of the material, etc., a total amount of the combination of components (A), (B) and (C) of from about 0.1 to about 10% by weight based on the weight of the organic material generally is sufficient to provide the desired stabilization. Generally it is observed that larger amounts of the stabilizing composition are required when treating lighter colored materials. The stabilizing compostions of the present invention comprising the combination of components (A), (B) and (C) may be blended with the organic materials to be stabilized by methods known in the art. The three components may be individually blended into the organic material to be stabilized, and the order of blending is not critical. Alternatively, mixtures of two of three of the components may be prepared and such mixtures blended into the organic material to be stabilized. The critical feature of the invention is that all three of the stabilizing components of the composition of the present invention are included in the organic material to be stabilized. The relative amounts of the three components may be varied depending upon the nature of the organic material to be stabilized, the color of the organic material (including pigments) etc. Generally, however, the relative amounts of the three components may be varied as follows: 1 to about 5 parts of component (A), 1 to about 5 parts of component (B), and 1 to about 5 parts of component (C).

In a preferred embodiment of the present invention, the three components are mixed together to form a composition which can thereafter be blended into the organic material to be stabilized. When the individual components (A), (B) and (C) are solids and liquids, it is preferred that the solid components be mixed with the liquid components to form a solution of the stabilizers, and this solution can be blended easily into the organic materials to be stabilized. Generally, it has been observed that formation of a solution and the incorporation of a solution of the stabilizer additives into an organic material produces a material which exhibits improved stability and resistance to deterioration when compared to a treated organic material wherein the individual stabilizer components (A), (B) and (C) have been introduced indivdually into the organic material. Also, it has been observed that the use of a mixture of a pigment or pigment dispersion added to a solution of components (A), (B) and (C) results in improved results with respect to pigment effectiveness.

In a preferred embodiment, the liquid solution of stabilizer components (A), (B) and (C) is prepared by heating the liquid component(s) to a temperature of from about 75° F. to about 210° F. and adding and mixing the solid component(s) into the heated liquid component(s) to form a solution. In some instances, the resulting solution is maintained at an elevated temperature such as about 100° F. to about 150° F. to minimize crystallization, but it also has been observed that if crystals do form, they can be redissolved easily by raising the temperature of the solution.

A specific example of the formation of such a solution of the components is as follows:

Liquid Tinuvin 765 is weighed into a mixing vessel, and an immersion heater is installed. Irganox 1010 dry antioxidant is added to the liquid under agitation with the immersion heater set at 200°-210° F. Once the Irganox 1010 begins to dissolve, the solid GIVSORB UV-2 addition begins. The batch size determines the time required for complete dissolution of the particles. Usually this occurs as the total batch temperature reaches the 200°-212° F. set point. Optimum stability of this solution is maintained by storing at about 135° F.

The stabilizer compositions of the present invention which comprise a mixture of stabilizer components (A), (B) and (C) also may contain one or more pigments and/or dyes normally used in polymeric materials. The pigments may be organic pigments and/or inorganic pigments, and the amount of pigment included in the stabilizer compositions of the present invention will be an amount sufficient to provide the desired color to the organic material into which the composition is blended. The pigments may be incorporated directly into the organic materials to be stabilized or into the stabilizer compositions of the present invention in dry form or as predispersions containing one or more pigments. When the pigments are incorporated into the stabilizer blends, the stabilizer/pigment blend can contain up to about 65% by weight of the pigment. The term "pigment" as used in the specification and claims also includes some materials which are sometimes referred to as fillers in polymers, and these include metal powders, metal oxides, and other inorganic compounds such as barium sulfate. Metal powders such as aluminum or bronze may be utilized as pigments to produce desired colors as well as provide other properties including improved thermal properties and electrical conductivity. Among the metallic oxides which can be utilized as pigments are zinc oxide, aluminum oxide, magnesium oxide, iron oxide red, iron oxide yellow, chrome oxide green, and titanium oxide. Other inorganic pigments which have been utilized to provide color to polymeric materials include zinc sulfide, cadmium sulfoselenide, cadmium mercury, zinc chromate, cobalt aluminate, chrome cobalt alumina, ultra-marine blue and lead carbonate.

A wide variety of organic pigments have been utilized as colorants in polymeric materials and any of the known organic pigment colorants can be utilized in the present invention. The generic names of some typical organic pigment colorants include Para Red, Lithol Rubine, Helio Bordeaux, Thioindigo, Thioindiogoid, Toluidine, Dioxazine, Red Lake C. and Red Lake R, Pyrazolone Red, Anthraquinone, Isoindolinone, Perylene, Benzidine Yellow Anilide, Benzidine Yellow Xylidide, Benzidine Yellow Anisidide, Flavanthrone, Phthalocyanine Blue, Phthalocyanine Green, Pigment Green B, Carbon Black, Bone Black, Azo, Aniline Black, etc.

As noted above, the stabilizer/pigment compositions can be prepared by mixing a predispersed pigment blend with the stabilizing mixture of components (A), (B) and (C). Pigment dispersions can be prepared in a variety of vehicles, and the choice of vehicle usually is governed by the end use for the dispersion. For example, the dispersion, including the vehicle should be compatible with any materials to which the dispersion is to be added.

In one embodiment, the vehicles may be glycols, polyester polyols and polyether polyols. Examples of glycols include ethylene glycol, 1,2,-propanediol, 1,4-butanediol, di-ethylene glycol, dipropylene glycol, etc.

Polyether polyols and polyester polyols useful as vehicles for preparing pigment dispersions include such polyols normally used in urethane formation. The amount of pigment and vehicle combined to form the dispersion can be varied over a wide range, and usually the dispersions will contain from about 10-80% by weight of pigment and from 20-90% of vehicle.

The following examples illustrate the preparation of the stabilizer compositions of the present invention comprising a mixture of stabilizers (A), (B) and (C), and optionally, one or more pigments. Unless otherwise indicated in these examples and elsewhere in the specification and claims, all parts and percentages are by weight, and all temperatures are in degrees centigrade.

|  | Parts by Wt. |
|---|---|
| Example 1 | |
| bis-(2,2,6,6-tetramethyl-4-piperidinyl) sebacate (Tinuvin 770) | 50 |
| N'—(4-n-butoxycarbonylphenyl)-N'—methyl-N'—phenyl-formamidine | 25 |
| n-octadecyl 3-(3,5-di-tert-butyl-4-hydroxyphenyl)-propionate (Irganox 1076) | 25 |
| Example 2 | |
| bis-(1,2,2,6,6-pentamethyl-4-piperidinyl)-2-n-butyl-2-(3,5-di-tert-butyl-4-hydroxybenzyl) malonate (Tinuvin 144) | 60 |
| N—(p-ethoxycarbonylphenyl)-N'—ethyl-N'—phenyl formamidine (Givsorb UV-2) | 20 |
| Tetrakis [methylene(3,5-di-tert-butyl-4-hydroxy hydrocinnamate]methane (Irganox 1010) | 20 |
| Example 3 | |
| Bis-(1,2,2,6,6-pentamethyl-4-piperidinyl)-sebacate (Tinuvin 765) | 60 |
| GIVSORB UV-2 | 20 |
| Irganox 1010 | 20 |
| Example 4 | |
| Bis-(1,2,2,6,6-pentamethyl-4-piperidinyl)-sebacate (Tinuvin 765) | 40 |
| GIVSORB UV-2 | 40 |
| Irganox 1010 | 20 |
| Example 5 | |
| Bis-(1,2,2,6,6-pentamethyl-4-piperidinyl)-sebacate (Tinuvin 765) | 40 |
| GIVSORB UV-2 | 40 |
| Irganox 1010 | 20 |
| Carbon Black | 17 |
| Example 6 | |
| Tinuvin 770 | 40 |
| GIVSORB UV-2 | 40 |
| Irganox 1010 | 20 |
| Example 7 | |
| Stabilizer Blend of Example 1 | 30 |
| Pigment Blend | 70 |
| Carbon black | 20 |
| Polyether polyol | 80 |
| Example 8 | |
| Stabilizer Blend of Example 4 | 15 |
| Pigment Blend | 85 |
| TiO$_2$ | 58.12 |
| Heliogen blue | 1.82 |

|                              | Parts by Wt. |
|------------------------------|--------------|
| Phthalocyanine green         | 0.32         |
| Carbon black                 | 0.09         |
| Polyether polyol             | 39.65        |
| Example 9                |              |
| Stabilizer Blend of Example 4| 25           |
| Pigment Blend                | 75           |
| TiO$_2$                      | 65           |
| Polyether Polyol             | 35           |
| Example 10               |              |
| Stabilizer Blend of Example 4| 50           |
| Pigment Blend                | 50           |
| TiO$_2$                      | 58.12        |
| Heliogen blue                | 1.82         |
| Phthalocyanine green         | 0.32         |
| Carbon Black                 | 0.09         |
| Ethylene glycol              | 39.65        |

The compositions of the present invention comprising components (A), (B) and (C), and optionally one or more pigments, are effective as stabilizers for organic materials normally subject to deterioration caused by heat and ultraviolet light. The stabilizer compositions are effective in a wide variety of organic materials including polyurethanes, polyesters, polyolefins, polycarbonates, polyvinyl chlorides, polyvinyl esters, polyvinyl styrenes, polysulfones, polyamides, polyepoxides and polyacrylic resins. In particular, the stability of the following polymers can be improved by incorporation of the compositions of the invention:

(1) Polymers which are derived from mono-or diolefins, e.g., polyethylene which can optionally be cross-linked, polypropylene, polyisobutylene, polymethylbutene-1, polymethylpentene-1, polyisoprene, polybutadiene.

(2) Mixtures of the homopolymers cited under (1), for example, mixtures of polypropylene and polyethylene, polypropylene and polybutene-1, polypropylene and polyisobutylene.

(3) Copolymers of the monomers based on the homopolymers cited under (1), for example ethylene/propylene copolymers, propylene/butene-1 copolymers, propylene/isobutylene copolymers, ethylene/butene-1 copolymers as well as terpolymers of ethylene and propylene with a diene, for example hexadiene, or dicyclopentadiene and copolymers of alpha-olefins, e.g., ethylene with crylic or methacrylic acid.

(4) Polystyrene.

(5) Copolymers of styrene and of alphamethylstyrene, for example, styrene/butadiene copolymers, styrene/acrylonitrile copolymers, styrene/acrylonitrile/methacrylate copolymers, styrene/acrylonitrile copolymers modified with acrylic ester polymers to provide impact strength as well as block copolymers, e.g., styrene/butadiene/styrene block copolymers.

(6) Graft copolymers of styrene, for example, the graft polymer of styrene to polybutadiene, the graft polymer of styrene with acrylonitrile to polybutadiene as well as mixtures thereof with the copolymers cited under (5), commonly referred to as acrylonitrile/-butadiene/styrene or ABS plastics.

(7) Halogen-containing vinyl polymers, for example, polyvinyl chloride, polyvinylidene chloride, polyvinyl fluoride, polychloroprene, chlorinated rubbers, vinyl chloride/vinylidene chloride copolymers, vinyl chloride/vinyl acetate copolymers, vinylidene chloride/vinyl acetate copolymers.

(8) Polymers which are derived from alpha,beta-unsaturated acids and derivatives thereof, polyacrylates and polymethacrylates, polyacrylic amides and polyacrylonitrile. The instant compounds are advantageously used in heat-curable acrylic resin lacquers which are composed of a copolymer of acrylic acid and one or more of its derivatives, and a melamine-formaldehyde resin.

(9) Polymers which are derived from unsaturated alcohols and amines and from the acyl derivatives thereof or acetals, for example polyvinyl alcohol, polyvinyl acetate, polyvinyl stearate, polyvinyl benzoate, polyvinyl maleate, polyvinyl butyral, polyallyl phthalate, polyallyl melamine and copolymers thereof with other vinyl compounds, for example, ethylene/vinyl acetate copolymers.

(10) Homopolymers and copolymers which are derived from epoxides, for example, polyethylene oxide or the polymers which are derived from bis-glycidyl ethers.

(11) Polyacetals, for example, polyoxymethylene, as well as polyoxymethylenes which contain ethylene oxide as comonomer.

(12) Polyalkylene oxides, for example, polyoxyethylene, polypropylene oxide or polyisobutylene oxide.

(13) Polyphenylene oxides.

(14) Polyurethanes such as are prepared from polyester polyols and polyether polyols with organic diisocyanates or diisocyanate prepolymers.

(15) Polycarbonates such as obtained from bisphenol A and phosgene.

(16) Polysulfones.

(17) Polyamides and copolyamides which are derived from diamines and dicarboxylic acids and/or from aminocarboxylic acids or the corresponding lactams, for example, polyamide 6, polyamide 6/6, polyamide 6/10, polamide 11, polyamide 12, poly-m-phenylene-isophthalamide.

(18) Polyesters which are derived from dicarboxylic acids and dialcohols and/or from hydroxycarboxylic acids or the corresponding lactones, for example, polyethylene glycol terephthalate, poly-1,4-dimethylolcyclohexane terphthalate.

(19) Cross-linked polymers which are derived from aldehydes on the one hand and from phenols, ureas and melamine on the other, for example phenol/formaldehyde, urea/formaldehyde and melamine/formaldehyde resins.

(20) Alkyd resins, for example glycerol/phthalic acid resins and mixtures thereof with melamine/formaldehyde resins.

(21) Unsaturated polyester resins which are derived from copolyesters of saturated and unsaturated dicarboxylic acids with polyhydric alcohols as well as from vinyl compounds as cross-linking agents and also the halogen-containing, flame-resistant modifications thereof.

(22) Natural polymers, for example, cellulose, rubber, as well as the chemically modified homologous derivatives thereof, for example, cellulose acetates, cellulose propionates and cellulose butyrates and the cellulose ethers, for example, methyl cellulose.

In general, the stabilizing mixtures of the invention comprising components (A), (B) and (C) are generally incorporated into organic materials such as organic polymers in amounts which are effective to provide the desired stabilization to ultraviolet radiation. Generally, the stabilizer compositions of the invention are incorporated in amounts from about 0.1 to about 10% by weight, and the amount utilized will depend upon the particular polymer system and the color of the polymer system. For example, lighter colored polymer systems generally require more stabilizer than dark-colored polymer systems. More generally, the stabilizer composition is incorporated in amounts to provide from about 0.5 to about 5% by weight of the stabilizer composition based on the weight of the organic material (polymer).

As mentioned earlier, the stabilizer compositions of the present invention comprising components (A), (B) and (C), and optionally pigments, dyes or colorants, may be incorporated into the organic materials to be stabilized by conventional techniques at any convenient stage prior to the manufacture of shaped articles therefrom. Although components (A), (B) and (C) may be added individually and in any order to the organic material, it is preferred to add the components as a preformed mixture of all three stabilizers and even more preferable that the preformed mixture be in the form of a solution.

The stabilizer compositions of the invention may be mixed with the polymer in dry powder form, or a solution of the stabilizer composition may be mixed with a solution, suspension or emulsion of the polymer. The stabilized organic materials of the present invention also may optionally contain from about 0.1 to about 10% preferably, from about 0.5 to about 3% by weight of the various conventional additives for the particular organic materials being treated.

When the stabilizer compositions of the invention are to be utilized to stabilize polyurethanes, the stabilizers may be added to the starting materials used for the production of polyurethanes. Thus, the stabilizer composition (with or without pigment, dyes or colorants) can be added to the polyester polyols and/or polyether polyols utilized in the reaction with the polyisocyanates to form the urethanes. Although not preferred, the stabilizers also may be added to the diisocyanates or to the NCO-terminated prepolymers produced from higher molecular weight polyhydroxy compounds and diisocyanates, before the polyurethane is produced.

The following examples illustrate the preparation of stabilized polymers in accordance with the procedures of the present invention.

|  | pbw |
| --- | --- |
| Example 11 | |
| Polyether Polyol (Baydur 726 B-side Mobay) | 100 |
| Diisocyanate (Baydur 726 A-side Mobay) | 130 |
| Stabilizer/Pigment Blend of Example 8 | 5.5 |
| Example 12 | |
| Polyether Polyol (Bayflex 110-5, B-side Mobay) | 100 |
| Diisocyanate (Bayflex 110-5, A-side Mobay) | 15 |
| Stabilizer/Pigment Blend of Example 10 | 5.2 |

The stabilized organic materials of the present invention have utility in the preparation of films, sheets and various molded, shaped or formed articles, particularly where such articles are to be used successfully in outdoor applications. Such uses include, for example, automotive parts such as bumpers, steering wheels, etc., golf carts, siding for homes, boats, posts, signs, plastic, pipe and tubing, vessels and containers, shoes. When the stabilizer compositions of the present invention are utilized to modify polymeric materials normally used in such applications, the stabilized polymers show improved ability to retain their appearance, particularly with respect to gloss, transparency and shape. Moreover, the overall weatherability of the treated polymers is significantly improved when compared to the same polymers which have not been treated in accordance with the present invention; i.e., polymers which have not been stabilized with the stabilizer compositions of the present invention.

The improved ability of the organic materials treated in accordance with the present invention to resist deterioration is demonstrated by subjecting molded plaques of the polymer systems with and without the stabilizing compositions of the present invention to extended exposure in a QUV Accelerated Weathering Tester. In this test, 3-inch by 6-inch plaques are placed within the weathering tester in which the atmosphere is maintained at 50°-60° C. for a period of up to 1000 hours. The test procedure comprises a UV cycle and a condensation cycle which are repeated throughout the test. The plaques are placed in the tester which contains a pan of water which can be heated as desired during the condensation cycle. During the UV cycle (generally 8 hours in length) the UV lamps within the tester are on. At the end of the UV cycle, the lamps are shut off, and the panels are cooled with room temperature air. The temperature of the water in the pan is raised to increase the relative humidity within the cabinet to 100%, and water condenses on the panels. When the UV cycle is 8 hours in length, the condensation cycle is 4 hours. At the end of the condensation cycle, the water temperature is reduced. The UV and condensation cycles are repeated until the test is completed. At various times during the test, for example, at 100 hours, 200 hours, 300 hours, etc., panels can be removed and rated for gloss and color retention, and after examination, the panels are returned to the tester.

In one embodiment, the following polishing test is utilized for evaluating the gloss-retention of molded urethane parts at the completion of the test. The steps of the test are:

(1) wash the exposed plaque with a mild soap in warm water with a soft cloth followed by a water rinse;
(2) allow the part to air dry;
(3) when dry, apply a small amount of DuPont No. 7 automotive polish to a soft cloth, and apply the polish to the plaque in a circular rubbing motion while applying moderate pressure;
(4) allow the polish to dry and buff with a clean cotton cloth to remove all polish residue; and
(5) visually examine the part and take glossmeter readings.

When the above gloss-retention test is conducted on urethane plaques in which the urethane formulation was modified to include the stabilizing compounds of the present invention, the plaques exhibited significantly improved gloss retention as compared to urethane plaques which do not contain a stabilizer composition of the present invention.

Similarly, when urethane and polyester polymer formulations are modified to include the stabilizer compositions of the present invention containing components (A), (B) and (C), and at least one pigment, plaques prepared from such formulations exhibit improved color retention when subjected to the QUV accelerated weathering test when compared to urethane and polyester panels containing color pigments but which do not contain components (A), (B) and (C).

While the invention has been explained in relation to its preferred embodiments, it is to be understood that the various modifications thereof will become apparent to those skilled in the art upon reading this specification. Therefore, it is to be understood that the invention disclosed herein is intended to cover such modification as fall within the scope of the appended claims.

We claim:

1. Organic materials normally subject to deterioration caused by ultraviolet light which contain an ultraviolet stabilizing effective amount of a mixture comprising
   (A) from one to about 5 parts by weight of at least one hindered amine light stabilizer,
   (B) from one to about 5 parts by weight of at least one formamidine of the formulae

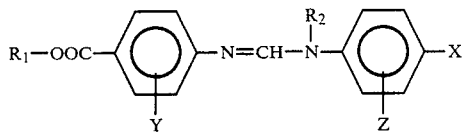
(I)

wherein $R_1$ is an alkyl group containing 1 to about 5 carbon atoms; Y is a H, OH, Cl or an alkoxy group; $R_2$ is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen, or

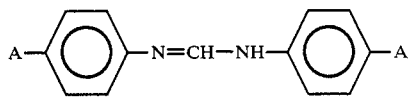
(II)

wherein A is —COOR, —COOH, —CONR'R", —NR'COR, —CN, or a phenyl group; and wherein R is an alkyl group of from 1 to about 8 carbon atoms; R' and R" are each independently hydrogen or lower alkyl groups of from 1 to about 4 carbon atoms, and
   (C) from one to about 5 parts by weight of at least one hindered phenolic antioxidant compound.

2. The organic material of claim 1 wherein the organic material is selected from the group consisting of polyurethanes, polyesters, polyolefins, polycarbonates, polyvinyl chlorides, polyvinyl esters, polystyrenes, polysulfones, polyamides, polyepoxides and polyacrylic resins.

3. The organic material of claim 1 also containing at least one pigment normally used with polymeric materials.

4. The organic material of claim 3 wherein the pigment is a carbon black.

5. The organic material of claim 1 wherein the organic material is a polyurethane or a polyester.

6. The organic material of claim 1 wherein component (B) is a formamidine characterized by Formula I.

7. The organic material of claim 1 wherein (A) is of the formula

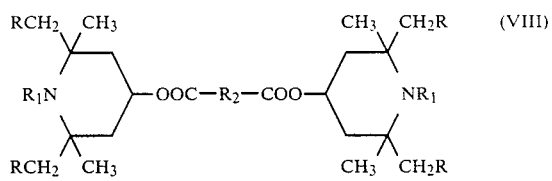
(VIII)

wherein $R_1$ is hydrogen or an alkyl group containing from 1 to about 12 carbon atoms; R is hydrogen or methyl; and $R_2$ is a substantially hydrocarbyl group.

8. The organic material of claim 1 wherein (C) is of the formula

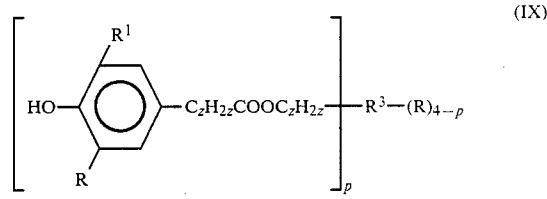
(IX)

R is hydrogen or lower alkyl; $R^1$ is lower alkyl; z is an integer from 2 to about 6; p is an integer from 2 to 4; $R^3$ is a tetravalent group selected from aliphatic hydrocarbons containing from 1 to about 30 carbon atoms, aliphatic mono- and dithioethers containing from 1 to about 30 carbon atoms, and aliphatic mono- and diethers containing from 1 to about 30 carbon atoms.

9. A method of incorporating solid and liquid ultraviolet stabilizing materials into a polyurethane comprising mixing the solid stabilizing material or materials in the liquid stabilizing material or materials to form a solution, and thereafter blending the solution into the polyurethane.

10. The method of claim 9 wherein at least one pigment normally used in polymers is incorporated into the solution prior to blending into the organic material.

11. The method of claim 9 wherein the liquid material or materials are maintained at a temperature of from 75° F. to about 210° F. during mixing and storage.

12. The method of claim 9 wherein the ultraviolet stabilizing materials comprise a mixture of
   (A) from one to about 5 parts by weight of a hindered amine like stabilizer,
   (B) from one to about 5 parts by weight of at least one formamidine of the formulae

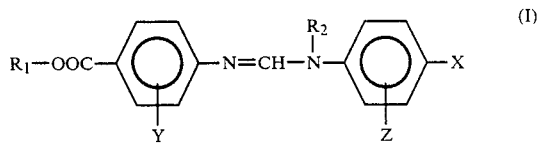
(I)

wherein $R_1$ is an alkyl group containing 1 to about 5 carbon atoms; Y is a H, OH, Cl or an alkyl group; $R_2$ is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen, or

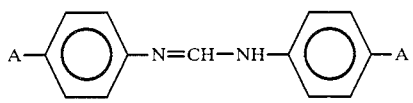 (II)

wherein A is —COOR, —COOH, —CONR'R",
—NR'COR, —CN, or a phenyl group; and
wherein R is an alkyl group of from one to about 8
carbon atoms; R' and R" are each independently
hydrogen or lower alkyl groups of from 1 to about
4 carbon atoms, and (C) from one to about 5 parts by weight of at least one hindered phenolic antioxidant.

13. A composition for stabilizing organic materials normally subject to deterioration caused by ultraviolet light comprising a mixture of
(A) from one to about 5 parts by weight of at least one hindered amine light stabilizer,
(B) from one to about 5 parts by weight of at least one formamidine of the formulae

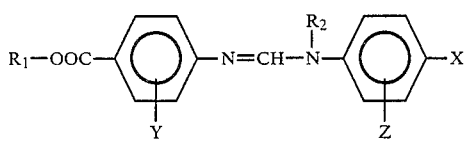 (I)

wherein $R_1$ is an alkyl group containing 1 to about 5 carbon atoms; Y is a H, OH, Cl or an alkoxy group; $R_2$ is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen, or

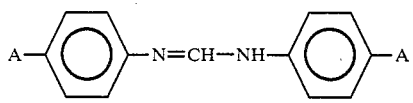 (II)

wherein A is —COOR, —COOH, —CONR'R",
—NR'COR, —CN, or a phenyl group; and
wherein R is an alkyl group of from one to about 8
carbon atoms; R' and R" are each independently
hydrogen or lower alkyl groups of from 1 to about
4 carbon atoms, and (C) from one to about 5 parts by weight of at least one hindered phenolic antioxidant compound.

14. The composition of claim 1 wherein the hindered amine light stabilizer is characterized by the formulae

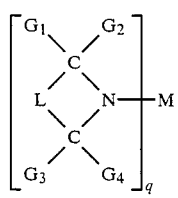 (III)

or

-continued

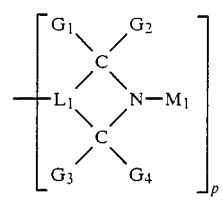 (IV)

wherein q is 1 or 2, p is 2 to 14, $G_1$, $G_2$, $G_3$ and $G_4$ are independently alkyl; or $G_1$ and $G_3$ together are alkylene or each are carboalkoxy or carbophenethoxy; or $G_1$ and $G_2$ or $G_3$ and $G_4$, independently of one another, together are alkylene or azaalkylene,; if q is 1, M is hydrogen, hydroxyl, oxyl, optionally substituted alkyl, alkenyl, alkynyl, aralkyl, alkanoyl, alkenoyl, benzoyl, glycidyl or —CH$_2$CHOHZ where Z is hydrogen, methyl or phenyl; if q is 2, M is alkylene, alkenylene, alkynylene, arylenedialkylene, the group —(CH$_2$)$_2$OOCR$_{1-8}$COO(CH$_2$)$_2$— or the group —CH$_2$OOOCR$_{1-9}$COOCH$_2$— where R$_{18}$ is alkylene and R$_{19}$ is alkylene, xylylene or cyclohexylene; M$_1$ has the meaning of M where q is 1; L is a divalent organic group which supplements the N-containing ring to form a 5 to 7 membered ring, or is two monovalent organic groups; and L$_1$ is a divalent organic group which supplements the N-containing ring to form a 5 to 7 membered ring and which additionally provides a linking group to other hindered amine moieties.

15. The composition of claim 1 wherein the hindered amine light stabilizer (A) is characterized by the formula

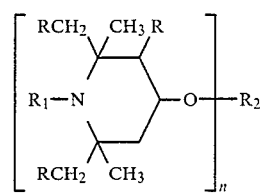 (V)

in which n is a number from 1 to 4 inclusive, preferably 1 or 2; R is hydrogen or lower alkyl; $R_1$ is hydrogen, oxyl, $C_{1-18}$ alkyl, $C_{3-8}$ alkenyl, $C_{3-8}$ alkynyl, $C_{7-12}$ aralkyl, $C_{1-8}$ alkanoyl, $C_{3-5}$ alkenoyl, glycidyl, a group —CH$_2$CH(OH)—Z wherein Z is hydrogen, methyl or phenyl, with $R_1$ preferably being hydrogen, $C_{1-12}$ alkyl, allyl, benzyl, acetyl or acryloyl; and $R_2$ when n is 1 is hydrogen, $C_{1-18}$ alkyl optionally interrupted by one or more oxygen atoms, cyanoethyl, benzyl, glycidyl, a monovalent radical of an aliphatic, cycloaliphatic, araliphatic or aromatic carboxylic acid, or a carbamic acid or of a phosphorus-containing acid, or a monovalent silyl group, preferably a group of an aliphatic carboxylic acid having 2 to 18 carbon atoms, of a cycloaliphatic carboxylic acid having 5 to 12 carbon atoms or of an aromatic carboxylic acid having 7 to 15 carbon atoms; $R_2$ when n is 2 is $C_{1-2}$ alkylene, $C_{4-12}$ alkenylene, xylylene, a bivalent group of an aliphatic, cycloaliphatic, araliphatic or aromatic dicarboxylic acid, of dicarbamic acid or of a phosphorus-containing acid, or a bivalent silyl group, preferably a group of an aliphatic dicarboxylic acid having 2 to 36 carbon atoms, of a cycloaliphatic or aromatic dicarboxylic acid having 8 to 14 carbon atoms, or of an aliphatic, cycloaliphatic or aromatic dicarbamic acid having 8 to 14 carbon atoms;

R2 when n is 3 is a trivalent group of an aliphatic, cycloaliphatic or aromatic tricarboxylic acid, of an aromatic tricarbamic acid or of a phosphorus-containing acid, or a trivalent silyl group; and R2 when n is 4 is a tetravalent group of an aliphatic, cycloaliphatic or aromatic tetracarboxylic acid.

16. The composition of claim 1 wherein the hindered amine light stabilizer is characterized by the formula

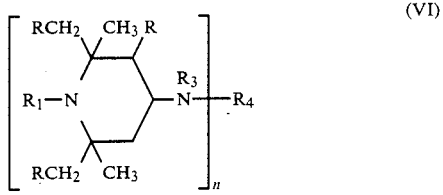

(VI)

in which n is the number 1 or 2; R is hydrogen or methyl; $R_1$ is hydrogen, oxyl, $C_{1-18}$ alkyl, $C_{3-8}$ alkenyl, $C_{3-8}$ alkynyl, $C_{7-12}$ aralkyl, $C_{1-8}$ alkanoyl or $C_{3-5}$ alkenoyl; $R_3$ is hydrogen, $C_{1-12}$ alkyl, $C_{5-7}$ cycloalkyl, $C_{7-8}$ aralkyl, $C_{2-18}$ alkanoyl, $C_{3-5}$ alkenoyl or benzoyl; and $R_4$ when n is 1 is hydrogen, $C_{1-18}$ alkyl, $C_{5-7}$ cycloalkyl, $C_{2-8}$ alkenyl which is unsubstituted or substituted by a cyano, carbonyl or carbamide group, or it is glycidyl, a group of the formula —CH2—CH(OH)—Z or of the formula —CON—H—Z wherein Z is hydrogen, methyl or phenyl; or $R_4$ when n is 2 is $C_{2-12}$ alkylene, $C_{6-12}$ arylene, xylylene, a —CH2—CH(OH)—CH2— group or a group —CH2—CH(OH)—CH2—O—X—O—CH2—CH(OH)—CH2— wherein X is $C_{2-10}$ alkylene, $C_{6-15}$ arylene or $C_{6-12}$ cycloalkylene; or, provided that $R_3$ is not alkanoyl, alkenoyl or benzoyl, $R_4$ can also be a bivalent group of an aliphatic, cycloaliphatic or aromatic dicarboxylic acid or dicarbamic acid, or can also be the group —CO—; or $R_3$ and $R_4$ together when n is 1 can be the cyclic group of an aliphatic or aromatic 1,2- or 1,3-dicarboxylic acid.

17. The composition of claim 1 wherein the hindered amine light stabilizer is characterized by the formula

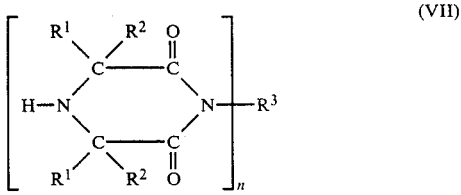

(VII)

wherein $R^1$ and $R^2$ are each independently methyl or ethyl or together with the carbon to which they are bound from a cyclopentyl or cyclohexyl ring which is unsubstituted or substituted with a methyl group; n is an integer of from 1 to 3; when n is 1, $R^3$ is an alkyl group of from 1 to about 20 carbon atoms or a benzyl group; when n is 2, $R^3$ is an alkylene group of from 1 to about 20 carbon atoms, a p-xylylene group or an alkyl-substituted p-xylylene group of the formula

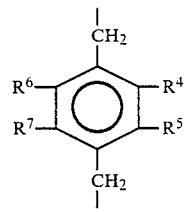

wherein $R^4$, $R^5$, $R^6$ and $R^7$ is hydrogen or lower alkyl group containing from 1 to 5 carbon atoms; when n is 3, $R^3$ is a 1,3,5-mesitylene group or a 2,4,6-alkyl substituted mesitylene group of a 2,4,6-alkyl-substituted mesitylene group of the formula

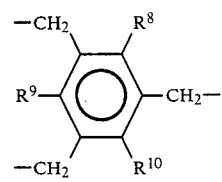

wherein $R^8$, $R^9$ and $R^{10}$ are hydrogen or lower alkyl, containing from 1 to about 5 carbon atoms.

18. The composition of claim 1 wherein the hindered amine light stabilizer (A) is characterized by the following formula

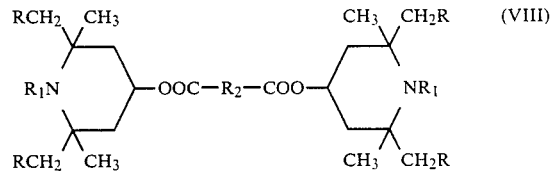

(VIII)

wherein $R_1$ is hydrogen or an alkyl group containing from 1 to about 12 carbon atoms; R is hydrogen or methyl; and $R_2$ is a substantially hydrocarbyl group.

19. The composition of claim 1 wherein X, Y and Z of Formula I are each hydrogen.

20. The composition of claim 1 wherein $R_2$ in Formula I is an alkyl group containing from 1 to about 9 carbon atoms.

21. The composition of claim 1 wherein the hindered phenolic antioxidant compound (C) is characterized by the formula

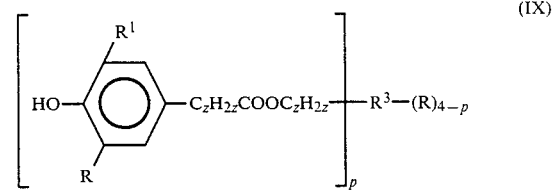

(IX)

R is hydrogen or lower alkyl; $R^1$ is lower alkyl; z is an integer from 2 to about 6; p is an integer from 2 to 4; $R^3$ is a tetravalent group selected from aliphatic hydrocarbons containing from 1 to about 30 carbon atoms, aliphatic mono- and dithioethers containing from 1 to about 30 carbon atoms, and aliphatic mono- and diethers containing from 1 to about 30 carbon atoms.

22. The composition of claim 21 wherein $R^3$ in Formula IX is a tetravalent group selected from aliphatic hydrocarbons containing from 1 to about 30 carbon atoms.

23. The composition of claim 22 wherein $R^3$ is a carbon atom and p is 4.

24. The composition of claim 1 containing, on a weight basis, from 1 to about 5 parts of (A), 1 to about 5 parts of (B), and 1 to about 5 parts of (C).

25. The composition of claim 1 also containing at least one pigment normally used in polymeric materials.

26. The composition of claim 25 wherein the pigment is carbon black.

27. Organic materials exhibiting improved resistance to ultraviolet light degradation comprising at least one organic material and an ultraviolet stabilizing effective amount of the composition of claim 25.

28. A composition for stabilizing organic materials normally subject to deterioration caused by ultraviolet light comprising a mixture of (A) from one to about 5 parts by weight of at least one hindered amine light stabilizer of the formula

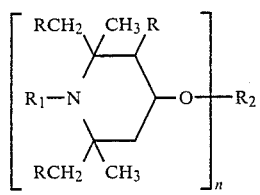
(V)

in which n is a number from 1 to 4 inclusive, preferably 1 or 2; R is hydrogen or lower alkyl; $R_1$ is hydrogen, oxyl, $C_{1-18}$ alkyl, $C_{3-8}$ alkenyl, $C_{3-8}$ alkynyl, $C_{7-12}$ aralkyl, $C_{1-8}$ alkanoyl, $C_{3-5}$ alkenoyl, glycidyl, a group $-CH_2CH(OH)-Z$ wherein Z is hydrogen, methyl or phenyl, with $R_1$ preferably being hydrogen, $C_{1-12}$ alkyl, allyl, benzyl, acetyl or acryloyl; and $R_2$ when n is 1 is hydrogen, $C_{1-18}$ alkyl optionally interrupted by one or more oxygen atoms, cyanoethyl, benzyl, glycidyl, a monovalent radical of an aliphatic, cycloaliphatic, araliphatic or aromatic carboxylic acid, or a carbamic acid or of a phosphorus-containing acid, or a monovalent silyl group, preferably a group of an aliphatic carboxylic acid having 2 to 18 carbon atoms, of a cycloaliphatic carboxylic acid having 5 to 12 carbon atoms or of an aromatic carboxylic acid having 7 to 15 carbon atoms; $R_2$ when n is 2 is $C_{1-12}$ alkylene, $C_{4-12}$ alkenylene, xylylene, a bivalent group of an aliphatic, cycloaliphatic, araliphatic or aromatic dicarboxylic acid, of dicarbamic acid or of a phosphorus-containing acid, or a bivalent silyl group, preferably a group of an aliphatic dicarboxylic acid having 2 to 36 carbon atoms, of a cycloaliphatic or aromatic dicarboxylic acid having 8 to 14 carbon atoms, or of an aliphatic, cycloaliphatic or aromatic dicarbamic acid having 8 to 14 carbon atoms; $R_2$ when n is 3 is a trivalent group of an aliphatic, cycloaliphatic or aromatic tricarboxylic acid, of an aromatic tricarbamic acid or of a phosphorus-containing acid, or a trivalent silyl group; and $R_2$ when n is 4 is a tetravalent group of an aliphatic, cycloaliphatic or aromatic tetracarboxylic acid, (B) from one to about 5 parts by weight of at least one formamidine of the formulae

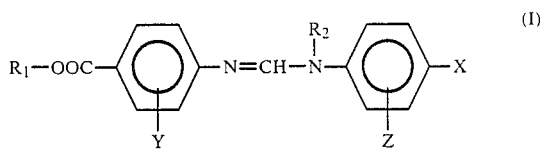
(I)

wherein $R_1$ is an alkyl group containing 1 to about 5 carbon atoms; Y is a H, OH, Cl or an alkoxy group; $R_2$ is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen, and (C) from one to about 5 parts by weight of at least one phenolic antioxidant of the formula

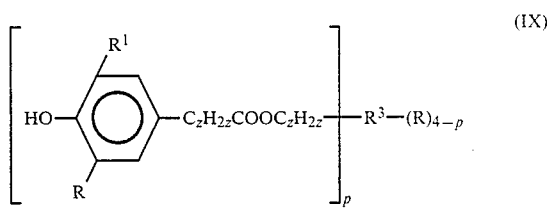
(IX)

R is hydrogen or lower alkyl; $R^1$ is lower alkyl; z is an integer from 2 to about 6; p is an integer from 2 to 4; $R^3$ is a tetravalent group selected from aliphatic hydrocarbons containing from 1 to about 30 carbon atoms, aliphatic mono- and dithioethers containing from 1 to about 30 carbon atoms, and aliphatic mono- and diethers containing from 1 to about 30 carbon atoms.

29. The composition of claim 28 wherein the hindered amine light stabilizer (A) is of the formula

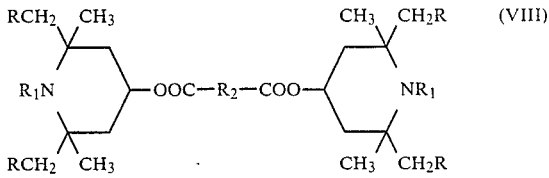
(VIII)

wherein $R_1$ is hydrogen or an alkyl group containing from 1 to about 12 carbon atoms; R is hydrogen or methyl; and $R_2$ is a substantially hydrocarbyl group.

30. The composition of claim 28 wherein X, Y and Z in Formula I are each hydrogen.

31. The composition of claim 28 wherein $R_2$ in Formula I is an alkyl group containing from 1 to about 9 carbon atoms.

32. The composition of claim 28 wherein $R^3$ in Formula IX is a tetravalent group selected from aliphatic hydrocarbons containing from 1 to about 30 carbon atoms.

33. The composition of claim 28 also containing at least one pigment normally used in polymeric materials.

34. The composition of claim 33 wherein the pigment is a color pigment.

35. The composition of claim 33 wherein the pigment is at least one carbon black.

36. The composition of claim 33 containing from about 1 to about 65% by weight of the pigment.

37. Organic materials exhibiting improved resistance to ultraviolet light degradation comprising at least one organic material and an ultraviolet stabilizing effective amount of the composition of claim 28.

38. Organic materials exhibiting improved resistance to ultraviolet light degradation comprising at least one organic material and an ultraviolet stabilizing effective amount of the composition of claim 33.

* * * * *